United States Patent [19]

Smith

[11] Patent Number: 5,447,408
[45] Date of Patent: Sep. 5, 1995

[54] BOAT TRAILER OVERHEAD CARRYING DEVICE

[76] Inventor: Hank Smith, P.O. Box 3936, Central Point, Oreg. 97502

[21] Appl. No.: 209,597

[22] Filed: Mar. 10, 1994

Related U.S. Application Data

[63] Continuation of Ser. No. 842,600, Mar. 5, 1992, abandoned.

[51] Int. Cl.⁶ .................... B60P 3/10; B60R 9/00
[52] U.S. Cl. ..................... 414/538; 414/462; 414/559; 414/537
[58] Field of Search ............... 414/462, 477, 478, 480, 414/491, 494, 500, 537, 538, 559; 410/3; 224/310

[56] References Cited

U.S. PATENT DOCUMENTS

| | | | |
|---|---|---|---|
| 2,398,730 | 4/1946 | Terry | 414/537 X |
| 3,648,866 | 3/1972 | Slown | 414/538 X |
| 3,690,490 | 9/1972 | Hall | 414/537 X |
| 3,708,081 | 1/1973 | Schladenhauffen | 414/462 |
| 3,732,998 | 5/1973 | Martin | 414/462 |
| 3,840,133 | 10/1974 | Berg | 414/462 |
| 4,531,879 | 7/1985 | Horowitz | 414/462 |
| 4,960,356 | 10/1990 | Wrenn | 414/462 X |
| 5,069,595 | 12/1991 | Smith et al. | 414/462 |
| 5,123,799 | 6/1992 | Breazeale | 414/462 |

FOREIGN PATENT DOCUMENTS

| | | | |
|---|---|---|---|
| 982988 | 2/1976 | Canada | 414/500 |
| 2492789 | 4/1982 | France | 414/462 |

*Primary Examiner*—Robert J. Oberleitner
*Assistant Examiner*—Stephen Gordon
*Attorney, Agent, or Firm*—Charles N. Hilke

[57] ABSTRACT

A boat carrying device comprising two outside ramps and a center ramp attachable to two outside support rails and a center rail, respectively. A winch located at the front bumper of a vehicle is attached to a boat on a trailer and pulled up the ramps and rails. The trailer hitch is attached to the boat trailer support ball on the A-support for fixably positioning the boat and trailer when travelling.

6 Claims, 3 Drawing Sheets

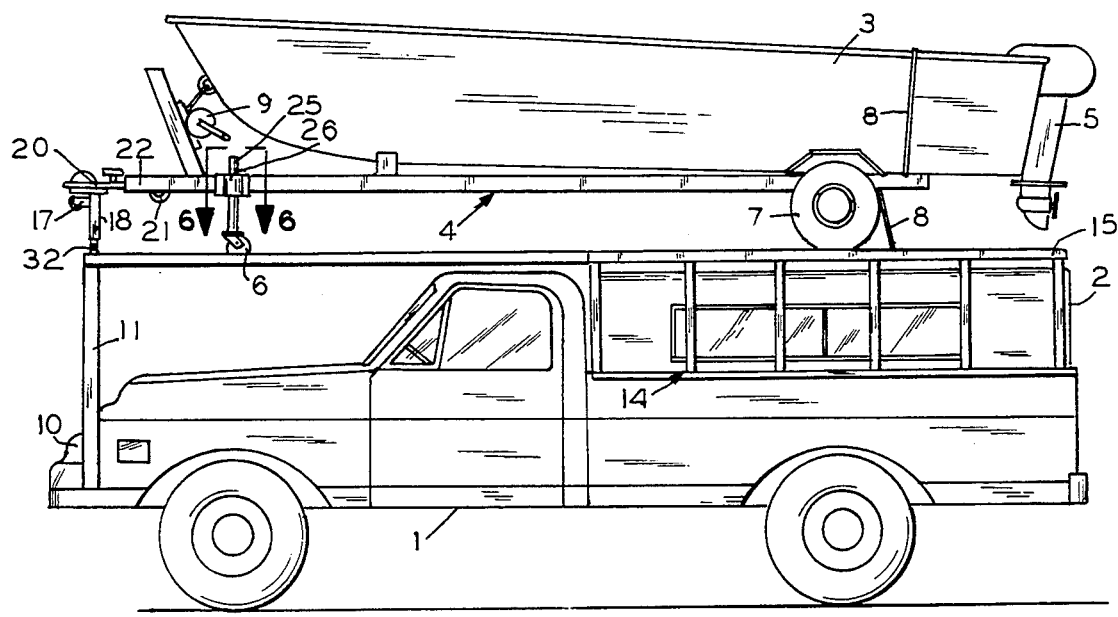

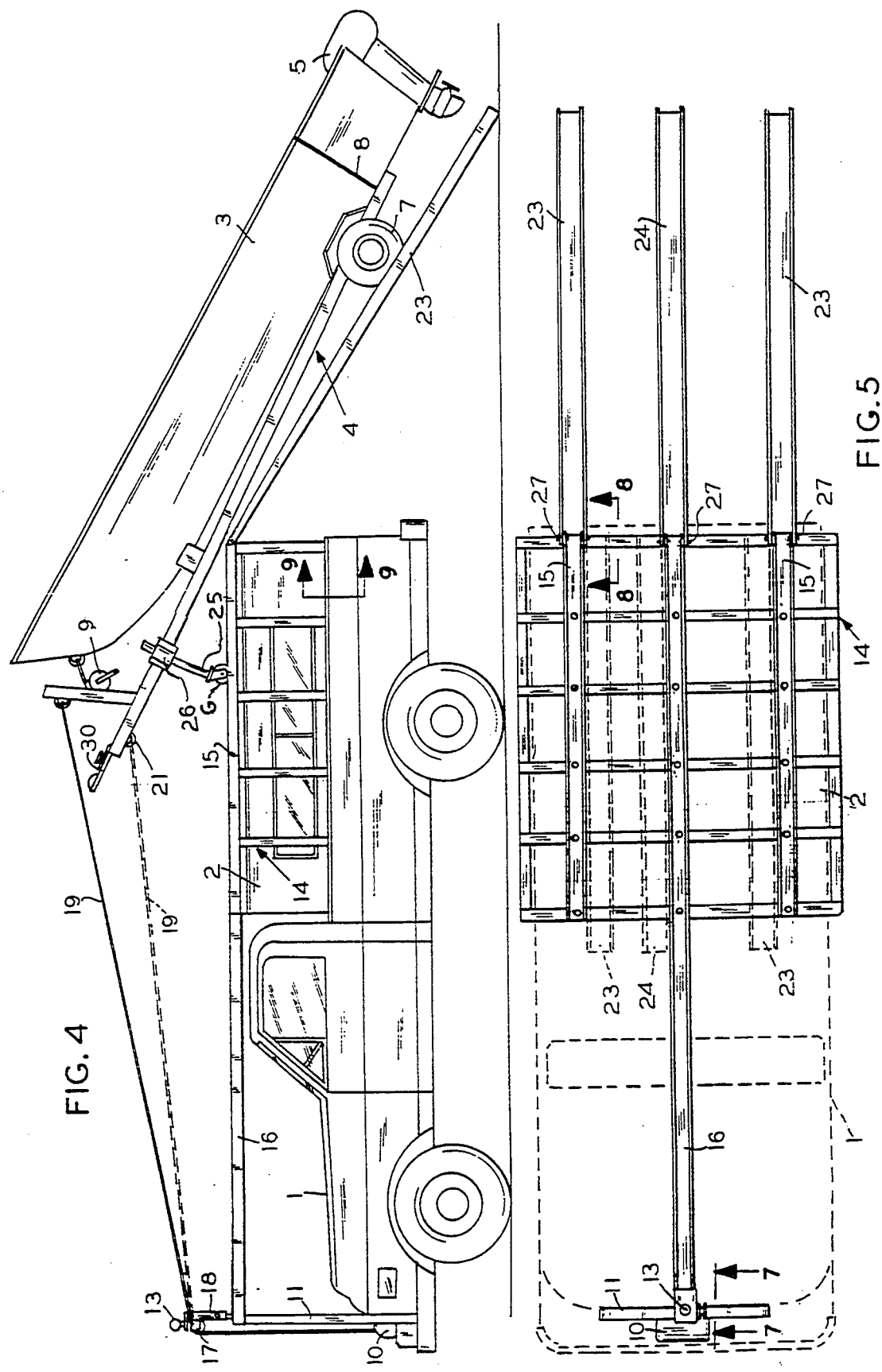

5,447,408

BOAT TRAILER OVERHEAD CARRYING DEVICE

This is a continuation of application Ser. No. 07/842,600 filed on Mar. 5, 1992 and now abandoned.

BACKGROUND OF THE INVENTION

1. Field of the Invention

This invention is generally related to carrying devices, and more particularly, a boat carrying device.

2. Prior Art

Conventional boat carriers involve placing the boat upside down on a rack above the carrying vehicle. This involves removing the gas tanks and motor and other miscellaneous items in the boat and placing them in the vehicle. Additionally, the wind can cause lift or drag problems with the upside down boat. Finally, one power unit can tow a trailer house and carry the boat and boat trailer on top.

BRIEF DESCRIPTION OF THE DRAWINGS

FIG. 1 is a side view of a boat and trailer resting on the invention on a vehicle.

FIG. 2 is a front view of the invention.

FIG. 3 is a rear view of the invention.

FIG. 4 is a side view of loading or unloading the boat and trailer on the invention.

FIG. 5 is a top view of the invention when in loading or unloading position.

DETAILED DESCRIPTION OF THE PREFERRED EMBODIMENT

Figure 6:
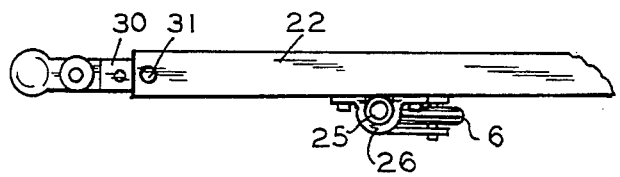
FIG. 6 is a detailed view of the trailer tongue.

FIG. 1 is a side view of the vehicle 1 with the boat 3 positioned on the support 14. The canopy 2, in this version, is located inside the support 14. The boat 3 is attached to the trailer 4 in the usual fashion. The trailer 4 uses a boat winch 9 to place the boat 3 in the trailer 4. The boat motor 5 is left attached to the boat 3. The trailer 4 has trailer wheels 7 with a dolly wheel 6. The tie down binders 8, two on each side, one pulls to the front and down on each side, and the other one pulls to the rear and down on each side. The vehicle winch 10 is positioned at the front of vehicle 1. The A-support 11 transfers the load from the center rail 16 to the front of the vehicle 1.

FIG. 2 is a front view of the vehicle 1 and support 14. The A-support 11 is shown in a cut-away view with the A-support attachment 12 attached to the vehicle frame 29. The vehicle winch 10 is at the center of the vehicle 1. The outside support rails 15 and boat trailer support ball 13 are also shown.

FIG. 3 is a rear view of vehicle 1 and support 14. Note, in this version, the canopy 2 is within the support 14. The two outside support rails 15 with the center rail 16 are clearly shown. The adjustable boat trailer support ball post 18 is positioned in the center rail 16. Pulley 17 is located on the side of the adjustable boat trailer support ball post 18 with the boat trailer support ball 13 on top.

FIG. 4 is a side view of loading or unloading the boat trailer 4 onto or off of the support 14 on the vehicle 1. The cable 19 from the vehicle winch 10 passes through the pulley 17 and is attached to the trailer pulling eye 21. Dolly wheel 6 is shown above the center rail 16. The dolly support bracket 26 attaches the trailer tongue jack 25 to the trailer 4. Both trailer wheels 7 are in outside ramps 23. Trailer tongue 22 and trailer hitch coupler 20 are shown.

FIG. 5 is a top view of the support 14 on the vehicle 1 with the loading ramps 23 and 24. Outside ramp 23 in ghost lines are shown stored adjacent to the outside support rails 15. The center ramp 24 is stored in either of the outside support ramps 23. If the telescoping ramps are used, they could be stored in a similar fashion or in enclosed pockets located directly under the outside and center support rails 15 and 16. Vehicle winch 10 is shown with the pulley 17 and the boat trailer support ball 13. The outside support rails 15 can be moved inward or outward for different trailer widths.

FIG. 6 is a detailed top view of the trailer tongue 22. The trailer tongue jack 25 is shown with dolly support bracket 26. The dolly wheel 6 is at the base of the trailer tongue jack 25. The extension tongue 30 is slidably positioned within the trailer tongue 22 by means of the extension tongue pin 31.

Figure 7:
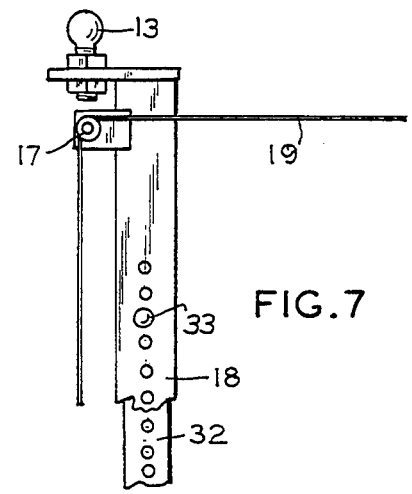
FIG. 7 is a side view of the adjustable boat trailer support ball post.

FIG. 7 is a side view of the adjustable boat trailer support ball post 18. The boat trailer support ball inner post 32 can vary the height of the adjustable boat trailer support ball post 18 to level boat trailer 4 by changing the location of support post pin 33.

Figure 8:
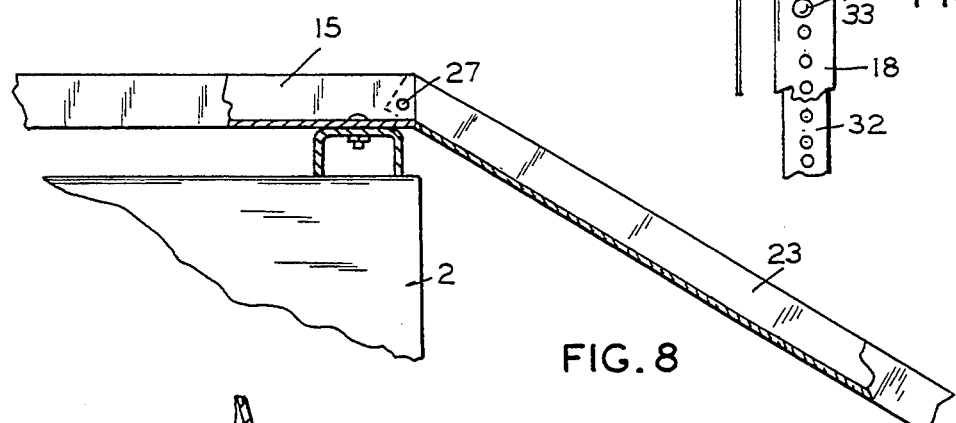
FIG. 8 is a detailed view showing the ramp attachment.

FIG. 8 shows how the ramp attachment 27 connects the outside support rails 15 to the outside ramp 23. Similarly the center rail 16 is attached to the center ramp 24.

Figures 9, 10:
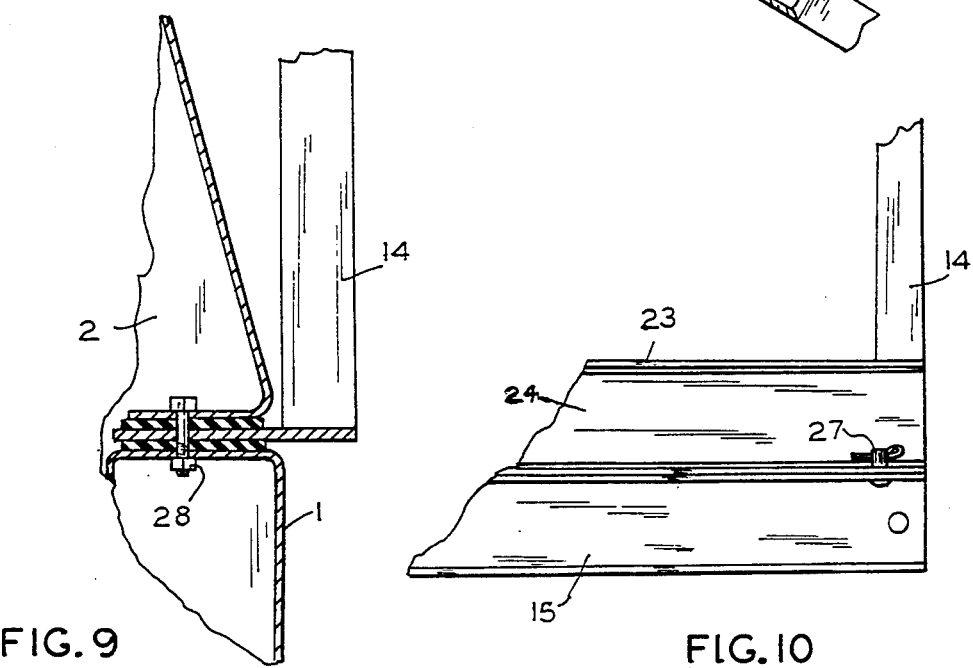
FIG. 9 shows the attachment of the support to the truck bed.
FIG. 10 is a top view of the center ramp with an outside ramp being stored.

FIG. 9 shows the support attachment 28 attaching the support 14 to the truck bed 1 in the version where the canopy is inside the support 14.

FIG. 10 is a top view of the center ramp 24 within the outside ramp 23 in storage, all attached together to the outside support rail 15 by means of ramp attachment 27.

In loading operation, the ramp attachment 27 is detached in order to remove both outside ramps 23 from the corresponding outside support rail 15. Also the ramp attachment 27 is detached in order to remove the center ramp 24 from its carrying position inside the outside ramp 23. Each of the outside ramps 23 and the center ramp 24 are positioned, one end on the ground with the other end attached to the outside support rail 15 or the center rail 16 by ramp attachment 27. The cable 19 is pulled off the vehicle winch 10 and placed on the pulley 17 (safety pin prevents cable 19 from coming out of pulley 17) then pulled to the base of the center ramp 24 and attached to the trailer pulling eye 21. While the operator stands near the base of the ramps 23 and 24, the dolly wheel 6 generally is near the center ramp 24, adjustments may be made, if necessary, by positioning the dolly wheel 6 of the boat trailer 4. The dolly wheel 6 rolls up the center ramp 24 until the two trailer wheels 7 approach their outside ramps 23. If necessary, align the outside ramps 23 for accepting the trailer wheels 7.

Continuing pulling the boat trailer 4 up the ramps 23 and 24 and onto the support 14 and up to where the trailer hitch coupler 20 is adjacent to the boat trailer support ball 13. Adjust height of coupler 20 to the support ball 13 by means of trailer tongue jack 25 or by raising the adjustable trailer support ball post 18 until ball 13 rests inside of coupler 20, secure adjustable boat trailer support ball post 18 and boat trailer support ball inner post 32 with support post pin 33. Attach coupler 20 to the support ball 13. Wind up winch cable 19. Replace and secure ramps 23 and 24 to their carrying position. Secure boat trailer 4 to the support 14 by 2 tie down binders 8 on each side of the boat 3; one pulling down and to the front on each side and one pulling down and to the rear on each side.

In unloading operation, put ramps 23 and 24 down first. Secure winch cable 19 to the pulling eye 21. Remove both tie down binders 8 on both sides. Undo the coupler 20, raise trailer 4 by trailer tongue jack 25 or by lowering adjustable boat trailer support ball post 18. Generally roll trailer 4 back and down the ramps 23 and 24. Take caution, if need be, to prevent boat motor 5 from dragging on the ground. Unhook cable 19 from trailer pulling eye 21, rewind winch 10 (remove safety pin). Replace the ramps 23 and 24 to the carrying position. Attached trailer 4 to back of vehicle 1.

Note that these items are adjustable to accommodate different size trailers and boats. The outside support rail 15 is adjustable in or out by means of bolts through the outside support rail 15 and support 14. The extension tongue 30 is horizontally adjustable to position the load where desired on top of the vehicle 1. The support ball post 18 is vertically adjustable to accommodate different trailers in order to level boat. The height of the canopy 2, in the version where the support 14 is located inside the canopy 2, can vary depending on individual preference.

While the preferred embodiment has been shown, various variations will occur to those skilled in the art. For example, the power winch 10 on the bumper could be replaced with an electric winch, hand winch, or block and tackle and the location could also be changed. The support 14 could be within the canopy 2 itself rather than external to the canopy 2. Further, the ramps 23, 24 and rails 15, 16 could contain a ramp elevator for clearance purposes. The ramp 23 and 24 could be two piece with a mid-support or be telescoping.

I claim:

1. A support comprising:
    a) a truck and a canopy on said truck;
    b) a middle ramp with two outside ramps positionable in a loading position between the ground and the top of the canopy on said truck;
    c) a center rail and two outside support rails mounted on top of said canopy where said center rail is extended to an A-support mounted on said truck's front bumper such that a boat trailer can be mounted horizontally level to the ground on said canopy; and where said two outside support rails are removably attachable to each of said outside ramps and where said center rail is removably attachable to said middle ramp; and
    d) a support ball post extending substantially in a vertical direction from said A-support and having a support ball attached thereto.

2. The support of claim 1 additionally comprising a power driven winch on said truck front bumper.

3. The support of claim 1 where said support ball post is vertically adjustable to horizontally level said relative to the ground boat trailer.

4. The support of claim 1 including a pulley positioned on said support ball post.

5. The support of claim 1 where said boat trailer has a horizontally adjustable trailer hitch for mounting on said support ball post.

6. The support of claim 1 including a plurality of hold downs used to attach a boat trailer to said canopy.

* * * * *